United States Patent
Takesue et al.

(12)

(10) Patent No.: US 6,525,139 B2
(45) Date of Patent: *Feb. 25, 2003

(54) GOLF BALL

(75) Inventors: Rinya Takesue, Chichibu (JP); Yasushi Ichikawa, Chichibu (JP); Shunichi Kashiwagi, Chichibu (JP)

(73) Assignee: Bridgestone Sport Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/489,006

(22) Filed: Jan. 21, 2000

(65) Prior Publication Data

US 2003/0008975 A1 Jan. 9, 2003

Related U.S. Application Data

(63) Continuation-in-part of application No. 08/997,036, filed on Dec. 23, 1997, now abandoned.

(30) Foreign Application Priority Data

Dec. 24, 1996 (JP) .............................. 8-355744
Mar. 14, 1997 (JP) .............................. 9-82160

(51) Int. Cl.⁷ .............................................. A63B 37/12
(52) U.S. Cl. ..................... 525/201; 525/92 A; 525/208; 525/217; 525/221; 525/223; 473/378; 473/385
(58) Field of Search ................................. 525/201, 208, 525/217, 221, 92 A, 223; 473/378, 385

(56) References Cited

U.S. PATENT DOCUMENTS

| 5,280,076 | A | * | 1/1994 | Sasaki |
| 5,407,998 | A | * | 4/1995 | Horiuchi |
| 5,559,188 | A | * | 9/1996 | Egashira |
| 5,625,003 | A | * | 4/1997 | Kato |
| 5,733,974 | A | * | 3/1998 | Yamada |
| 5,863,986 | A | * | 1/1999 | Herrmann-Schonherr |

FOREIGN PATENT DOCUMENTS

| JP | 02-129266 | * | 5/1990 |
| JP | 6-319832 | * | 11/1994 |

OTHER PUBLICATIONS

Translation of J06319832.*

* cited by examiner

Primary Examiner—David J. Buttner
(74) Attorney, Agent, or Firm—Sughrue Mion, PLLC

(57) ABSTRACT

A golf ball having a core and a cover enclosing the core. The cover has one or more layers. At least one of the cover layers is composed mainly of a rubber-modified thermoplastic resin composition consisting essentially of a base resin in the form of an ionomer resin, a non-ionomer thermoplastic elastomer or a mixture thereof and a crosslinked functional rubbery copolymer.

4 Claims, No Drawings

GOLF BALL

CROSS REFERENCE TO RELATED APPLICATION

This application is a continuation-in-part of application Ser. No. 08/997,036 filed on Dec. 23, 1997 now abandoned, the entire contents of which are hereby incorporated by reference.

BACKGROUND OF THE INVENTION

1. Field of the Invention

This invention relates to a golf ball which is improved in durability and restitution while providing a soft hitting feel.

2. Prior Art

Ionomer resins have been widely used as the golf ball cover stock. Ionomer resins are ionic copolymers of an olefin such as ethylene with an unsaturated carboxylic acid such as acrylic acid, methacrylic acid and maleic acid wherein the acidic group is partially neutralized with a metal ion such as sodium and zinc. Because of many superior properties including durability and resiliency, they are suitable as a base resin of golf ball cover stocks.

When used as a golf ball cover stock, however, the ionomer resins have the drawback that the cover gives a hard hitting feel and lacks the flexibility required to impart a necessary spin rate to control the ball in flight. More particularly, since the ionomer resins are relatively hard, the ball is not compressed into full contact with the club face upon impact and hence, less spin is imparted. A golf ball using a harder ionomer resin as the cover stock becomes very hard in hitting feel.

It was desired to develop a golf ball cover stock which can provide spin susceptibility and feeling fit for skilled low-handicap golfers and professional golfers and has improved durability and restitution.

To solve the above-mentioned problems, extensive investigations were made on many two- and three-piece solid golf balls. With respect to the core, it is known in the art to use a soft core in order to soften a two-piece solid golf ball for achieving a soft hitting feel. The soft core, however, has the problem that the ball becomes less durable because of a larger amount of ball deformation upon impact.

With respect to the golf ball cover, a cover composition comprising an ionomer resin in admixture with a core-shell polymer consisting of a core of rubbery polymer and a shell of vitreous polymer was proposed as providing durability (see JP-A 319832/1994). More particularly, the cover composition is described as comprising an ionic ethylene copolymer based on an ethylene-unsaturated carboxylic acid copolymer in admixture with a core-shell polymer. The core-shell polymer consists of a core of a rubbery polymer having an epoxy, carboxyl or acid anhydride group on the surface and a shell of a vitreous polymer free of an epoxy, carboxyl and acid anhydride group and a functional group reactive therewith and serves to improve impact resistance. Using the ionomer resin having the core-shell polymer blended therein as a cover stock, the golf ball is improved in durability.

However, since the core-shell polymer contains as the shell the vitreous polymer which is not effective for improving durability, a large amount of the core-shell polymer must be blended in order to provide practical durability. If the amount of the core-shell polymer blended is increased to a sufficient level to achieve a significant improvement in durability, the golf ball suffers from a substantial loss of restitution.

Also a golf ball cover composition comprising an ionomer resin in admixture with a diene rubber was proposed in JP-A 79017/1994 as achieving an improvement in hitting feel. This cover composition contains the ionomer resin and the diene rubber in a weight ratio of 95:5 to 60:40. The diene rubber which is non-functional rubber is crosslinked with a crosslinking agent upon mixing it under heat with the ionomer resin. The cover composition comprising an ionomer resin in admixture with a conventional non-functional rubber is improved in hitting feel, but suffers from substantial losses of mechanical strength, impact resistance, oil resistance, resilience, and moldability. This cover composition is not practically acceptable as a golf ball cover stock. Furthermore, the cover composition using the diene rubber which is not previously crosslinked but is crosslinked upon heat mixing with the ionomer resin by a crosslinking agent would give a considerable variability of particle sizes in the rubber. This may cause a low compatibility and low durability. In addition, since the crosslinking reaction depends on the molding conditions of the rubber composition, it is very difficult to stabilize the physical properties of the cover such as melt viscosity and hardness. Thus, the use of the cover composition of JP-A 79017/1994 would result in a remarkably low productivity.

SUMMARY OF THE INVENTION

Therefore, an object of the invention is to provide a novel and improved golf ball offering a soft hitting feel and having improved durability and restitution.

We have found that when a core is enclosed with a cover having one or more layers at least one of which is composed mainly of a rubber-modified thermoplastic resin composition consisting essentially of a base resin component in the form of an ionomer resin, a non-ionomer thermoplastic elastomer or a mixture thereof and a previously crosslinked functional rubbery copolymer preferably having a gel content of at least 20% by weight, the resulting golf ball offers a soft hitting feel and is improved in durability and restitution.

More particularly, the base resin component in the form of an ionomer resin, a non-ionomer thermoplastic elastomer or a mixture thereof is blended with a crosslinked functional rubbery copolymer of (a) a monomer having at least one functional group selected from the group consisting of carboxyl, epoxy, hydroxyl and amino groups, (b) at least one monomer selected from the group consisting of acrylonitrile, butadiene, isoprene, and acrylates, and (c) a crosslinker in the form of a polyfunctional monomer, instead of the conventional non-functional rubber or core-shell polymer containing a vitreous polymer. Then, reaction or interaction occurs between a reactive group in the functional rubbery copolymer and a reactive group in the base resin to form a high bond strength interface between the components, achieving a drastic improvement in durability at no sacrifice of resilience. The functional rubbery copolymer has the effect of softening the resin, contributing to a soft hitting feel. As opposed to the blending of a core-shell polymer containing a vitreous polymer, only a small amount of the functional rubbery copolymer can achieve a drastic improvement in durability without adversely affecting resilience. This leads to molding and economic advantages. Drastic improvements in mechanical strength, impact resistance, and oil resistance are achieved as compared with the base resin having non-functional rubber blended therein. The cover stock containing the functional rubbery copolymer is also improved in feeling, modulus of elasticity, and molding or dimensional stability, overcoming the problems of the prior art cover stocks.

The present invention provides a golf ball comprising a core and a cover enclosing the core, said cover having one or more layers, at least one cover layer being composed mainly of a rubber-modified thermoplastic resin composition consisting essentially of a base resin in the form of an ionomer resin, a non-ionomer thermoplastic elastomer or a mixture thereof and a crosslinked functional rubbery copolymer preferably having a gel content of at least 20% by weight.

Preferably, the functional rubbery copolymer is a crosslinked copolymer of (a) a monomer having at least one functional group selected from the group consisting of carboxyl, epoxy, hydroxyl and amino groups, (b) at least one monomer selected from the group consisting of acrylonitrile, butadiene, isoprene, and acrylates, and (c) a crosslinker in the form of a polyfunctional monomer. The preferred functional rubbery copolymer is in particulate form having a mean particle size of up to 500 nm.

The ionomer resin is preferably comprised of an olefin-unsaturated carboxylic acid copolymer having an acid content of 10 to 25% by weight. The non-ionomer thermoplastic elastomer is preferably a polyurethane elastomer, polyester elastomer, polyamide elastomer or a mixture thereof.

The cover stock according to the present invention is obtained by mixing the previously crosslinked functional rubbery copolymer with an ionomer resin, a non-ionomer thermoplastic elastomer or a mixture thereof under heat without crosslinking the functional rubbery copolymer upon mixing, and has an excellent moldability and a high stability of the physical properties. Furthermore, when the crosslinked functional rubbery copolymer having particulate form is preferably adjusted so that the particles have a mean particle size of up to 500 nm, more preferably up to 100 nm, the dispersibility of the crosslinked functional rubbery copolymer to the ionomer resin, the non-ionomer thermoplastic elastomer or the mixture thereof is extremely improved, resulting in effectively improving durability and resilience.

DETAILED DESCRIPTION OF THE INVENTION

The golf ball according to the present invention includes a core and a cover enclosing the core. The cover ay be a single-layer cover or a multi-layer cover having a plurality of layers. Preferably, the multi-layer cover has a two-layer construction of an inner cover layer and an outer cover layer.

In the present invention, at least one cover layer, e.g. the single-layer cover and the inner cover layer or the outer cover layer of the multi-layer cover, is mainly composed of a rubber-modified thermoplastic resin composition. The composition consists essentially of a base resin in the form of an ionomer resin, a non-ionomer thermoplastic elastomer or a mixture thereof and a crosslinked functional rubbery copolymer.

The base resin may be an ionomer resin alone, a non-ionomer thermoplastic elastomer alone, or a mixture of an ionomer resin and a non-ionomer thermoplastic elastomer.

The ionomer resin is an olefin-unsaturated carboxylic acid copolymer neutralized with a metal ion. The olefins are preferably hydrocarbons of 2 to 8 carbon atoms, for example, ethylene, propylene, butene, pentene, hexene, heptene, and octene, with ethylene being most preferred. The unsaturated carboxylic acids are preferably those of 3 to 8 carbon atoms, for example, acrylic acid, methacrylic acid, maleic acid, and fumaric acid, with acrylic acid and methacrylic acid being most preferred. The olefin-unsaturated carboxylic acid copolymer constituting the ionomer resin should preferably have a carboxylic acid content of 10 to 25% by weight, more preferably 10 to 20% by weight. A copolymer with an acid content of less than 10% by weight would be less rigid and less resilient whereas a copolymer with an acid content of more than 25% by weight would be too rigid and adversely affect the hitting feel.

The carboxyl group of the unsaturated carboxylic acid in the copolymer is neutralized with a metal ion. The degree of neutralization is preferably 20 to 80 mol %, more preferably 25 to 70 mol %. A copolymer with a degree of neutralization of less than 20 mol % would be less rigid and less resilient whereas a copolymer with a degree of neutralization of more than 80 mol % would little improve the physical properties of the cover stock and adversely affect the flow and workability thereof. The metal ions used for neutralization are preferably Li+, Na+, K+, Zn++, Co++, Ca++, Ni++, Cu++, Pb++, and Mg++, especially Li+, Na+, Zn++, and Mg++. These metal ions may be used in compound form as formates, acetates, nitrates, carbonates, hydrogen carbonates, oxides, hydroxides, and alkoxides.

These ionomer resins are commercially available as a golf ball cover stock. Commercial examples include Himilan AM7315, Himilan AM7317, Himilan AM7318, Himilan 1706, Himilan 1605, Himilan 1601 and Himilan 1557 by Mitsui duPont Polychemical K.K. They may be used alone or in admixture of two or more.

The non-ionomer thermoplastic elastomer is selected from a polyurethane elastomer, polyester elastomer, polyamide elastomer, and a mixture thereof. These non-ionomer thermoplastic elastomers are commercially available. Exemplary polyurethane elastomers include X-4517 by Goodrich Co. and Pandex T7890 by Dai-Nihon Ink Chemical Industry K.K.; an exemplary polyester elastomer is Hytrel 4047 by Toray duPont K.K.; and an exemplary polyamide elastomer is Pebax 4033SA by Atochem. They may be used alone or in admixture of two or more.

According to the invention, the base resin is blended with a previously crosslinked functional rubbery copolymer. Preferred is a particulate polymer obtained by introducing a functional group into a crosslinked rubber. The particulate polymer should preferably have a mean particle size of up to 500 nm, preferably up to 100 nm, more preferably 20 to 100 nm, most preferably 40 to 100 nm. Particles with a mean particle size in excess of 500 nm would be less dispersible in the matrix resin, failing to impart mechanical strength and durability.

The functional rubbery copolymer is typically a crosslinked copolymer obtained by copolymerizing (a) a monomer having at least one functional group selected from the group consisting of carboxyl, epoxy, hydroxyl and amino groups and (b) at least one monomer selected from the group consisting of acrylonitrile, butadiene, isoprene, and acrylates with (c) a crosslinker in the form of a polyfunctional monomer.

The monomers having a functional group (a) include monomers having a carboxyl group such as acrylic acid, methacrylic acid, maleic acid, and fumaric acid; monomers having an epoxy group such as glycidyl (meth)acrylate, acryl glycidyl ether, and vinyl glycidyl ether; monomers having a hydroxyl group such as 1-hydroxypropyl (meth) acrylate, 2-hydroxypropyl (meth)acrylate, and hydroxyethyl (meth)acrylate; monomers having an amino group, for example, monomers having a tertiary amino group such as dimethylaminoethyl (meth)acrylate, diethylaminoethyl (meth)acrylate, and dibutylaminoethyl (meth)acrylate.

The monomers (a) are non-aromatic monomers and do not contain an aromatic ring.

The monomers (b) are preferably acrylonitrile, butadiene, isoprene and acrylates. The acrylates include alkyl (meth) acrylates and alkoxy (meth)acrylates. Examples of the alkyl (meth)acrylate are ethyl acrylate, ethyl methacrylate, propyl acrylate, butyl acrylate, butyl methacrylate, hexyl acrylate, 2-ethylhexyl acrylate, and octyl acrylate. Examples of the alkoxy (meth)acrylate are ethoxyethyl acrylate, methoxyethyl acrylate, propoxyethyl acrylate, methoxyethyl methacrylate, ethoxyethyl methacrylate, butoxyethyl acrylate, and butoxyethyl methacrylate.

Alkyl (meth)acrylates and alkoxy (meth)acrylates having a functional group introduced therein are also useful. Exemplary are cyanoethyl (meth)acrylate, mercaptopropyl (meth) acrylate, and vinyl (meth)acrylate.

The monomers (b) are also non-aromatic monomers and do not contain an aromatic ring.

The functional rubbery copolymer should preferably contain 1 to 20%, more preferably 1 to 15% by weight of the unit from the functional group-containing monomer (a). A copolymer with less than 1% of monomer unit (a) would be less reactive with the base resin, failing to provide mechanical strength. More than 20% of monomer unit (a) would reduce the rubber properties of a copolymer and hence, a cover stock, sometimes resulting in losses of elasticity and impact resistance.

In case of using a carboxyl group-containing monomer as the functional group-containing monomer, the functional rubbery copolymer should preferably have an acid value of 5 to 200 mg KOH/g, more preferably 5 to 150 mg KOH/g.

In case of using an epoxy group-containing monomer as the functional group-containing monomer, the functional rubbery copolymer should preferably have an epoxy equivalent of 700 to 15,000, more preferably 900 to 15,000.

The functional rubbery copolymer should preferably contain 70 to 99%, more preferably 80 to 97% by weight of the unit from the monomer (b). Less than 70% by weight of monomer unit (b) would reduce the restitution of a cover. More than 99% by weight of monomer unit (b) would be less compatibility with a thermoplastic elastomer, resulting in an inferior durability.

A polyfunctional monomer (c) is added as a crosslinker to monomers (a) and (b) to prepare a functional rubbery copolymer. Examples of polyfunctional monomers (c) include divinyl ether, divinyl benzene, and ethylene glycol di(meth)acrylate.

The functional rubbery copolymer should preferably contain 0.1 to 10%, more preferably 0.2 to 5.0% by weight of the unit from the polyfunctional monomer. More than 10% by weight of the polyfunctional monomer would reduce the mechanical strength of a cover.

By introducing the polyfunctional monomer unit, there can be obtained a crosslinked functional rubbery copolymer having a gel content of at least 20%, preferably 40 to 95%, more preferably 50 to 94%, most preferably 80 to 93% by weight. A copolymer having a gel content of less than 20% by weight may tend to lower the molding stability, whereas a copolymer having a gel content of more than 95% by weight would fail to impart rubbery elasticity.

It is noted that the gel content is an amount of insoluble matter in a crosslinked functional rubbery copolymer. It is obtained by adding and standing about 1 g of a functional rubbery copolymer sample in 100 ml of methyl ethyl ketone for 24 hr, and then measuring the amount of an insoluble matter in the solution.

The crosslinked functional rubbery copolymer can be prepared by adding an emulsifier, initiator, molecular weight regulator, and other polymerization aids to the above-mentioned monomers (a), (b) and (c) and effecting emulsion polymerization according to a conventional process, whereby the resulting copolymer is a crosslinked one due to the introduction of monomer (c), i.e., the crosslinker. Typical emulsion polymerization is effected at a temperature of 0 to 50° C. in a reactor from which oxygen has been purged. In the process, the monomers, emulsifier, initiator, molecular weight regulator, and other polymerization aids may be added in their entireties before the initiation of reaction or added in divided portions before and after the initiation of reaction. Reaction conditions including temperature and agitation speed may be altered with the progress of reaction. The polymerization process may be either continuous or batchwise.

No particular limit is imposed on the molecular weight of the resulting functional rubbery copolymer. Preferably it has a Mooney viscosity (ML1+4, 100° C.) of 20 to 120, more preferably 40 to 120. A Mooney viscosity of less than 20 would fail to impart rubbery elasticity to a cover stock while a Mooney viscosity of more than 120 would render a cover stock less workable.

These crosslinked functional rubbery copolymers are commercially available, for example, under the trade name of XER91P resin modifier [functional rubbery copolymer (a crosslinked acrylonitrile-butadiene rubber to which a carboxyl group is introduced)] and XER71P resin modifier [functional rubbery copolymer (a crosslinked acrylonitrile-butadiene rubber to which an epoxy group is introduced)] both from Nippon Synthetic Rubber K.K.

Preferably, the rubber-modified thermoplastic resin composition constituting a main component of the golf ball cover stock according to the invention is obtained by blending 100 parts by weight of the base or matrix resin with 1 to 100 parts, more preferably 2 to 20 parts, most preferably 3 to 15 parts by weight of the crosslinked functional rubbery copolymer and mixing the components at 150 to 250° C. Less than 1 part of the functional rubbery copolymer would fail to impart impact resistance to the cover layer whereas a composition containing more than 100 parts of the functional rubbery copolymer would not maintain high resiliency. Since the mixing step is not critical, any suitable one may be selected from roll mills, intermixers, and extruders depending on a particular mixing ratio of the crosslinked functional rubbery copolymer to the base resin. It is also possible to previously dissolve the crosslinked functional rubbery copolymer in a suitable solvent and mix the solution with the base resin.

In addition to the rubber-modified thermoplastic resin composition, the cover layer of the invention may contain other components, for example, a metal salt of stearic acid. The stearic acid metal salt, which does not alter the performance of the golf ball, is blended for the purpose of improving the molding properties of the cover stock. For example, magnesium stearate is blended in an amount of 0.2 to 3.0% by weight, preferably 0.5 to 1.5% by weight of the entire cover stock. If desired, dyestuffs, pigments such as titanium dioxide, zinc oxide, and barium sulfate, UV absorbers, antioxidants, and dispersants such as metal soaps are added to the cover stock in commonly used amounts.

As opposed to the conventional blending of a base resin with a core-shell polymer containing a vitreous polymer, the golf ball cover stock of the invention has the advantage that only a small amount of the crosslinked functional rubbery copolymer can achieve a drastic improvement in durability without adversely affecting resilience. It is also advantageous in molding and cost. Drastic improvements in mechanical strength, impact resistance, and oil resistance are achieved as compared with the base resin having non-functional rubber blended therein. The cover stock containing the crosslinked functional rubbery copolymer is also improved in feeling, modulus of elasticity, and molding or dimensional stability.

The method of enclosing a core with the cover stock of the invention is not critical. A golf ball may be prepared either by injection molding the molten cover stock over a core or by preforming hemispherical shells from the cover stock, enclosing a core with a pair of preformed shells, and effecting compression molding. The gage and hardness of the cover may be properly adjusted insofar as the objects of the invention are achievable.

For a single-layer cover, the cover layer composed of the rubber modified thermoplastic resin composition may preferably have a gage (thickness) of 1.4 to 2.5 mm, especially 1.5 to 2.3 mm and a Shore D hardness of 40 to 75, especially 45 to 70.

For a multi-layer cover, typically a two-layer cover, an inner cover layer or an outer cover layer is composed of the rubber modified thermoplastic resin composition. Preferably, the outer cover layer is composed of the rubber modified thermoplastic resin composition. The layer composed of the rubber modified thermoplastic resin composition may preferably have a gage (thickness) of 1.0 to 2.2 mm, especially 1.3 to 2.1 mm and a Shore D hardness of 40 to 75, especially 45 to 70, and the other layer which may be composed of an ionomer resin, a non-ionomer thermoplastic elastomer or a mixture thereof as exemplified above may preferably have a gage (thickness) of 1.0 to 2.2 mm, especially 1.3 to 2.1 mm. The total gage (thickness) of the multi-layer cover may preferably be 2.0 to 4.4 mm, especially 2.6 to 4.2 mm.

The core to be enclosed with the cover may be either a solid core or a wound core. The wound core may have a solid or liquid center. In the case of the solid core, it may be a single layer core or a core of multilayer structure consisting of two or more layers. For soft hitting feel, the solid core preferably has a hardness as expressed by a distortion of 2.8 to 5.0 mm, especially 3.0 to 4.5 mm under an applied load of 100 kg.

For soft hitting feel, the entire golf ball preferably has a hardness as expressed by a distortion of 2.6 to 4.5 mm, especially 2.6 to 4.0 mm under an applied load of 100 kg. The diameter and weight of the ball are properly determined in accordance with the Rules of Golf.

EXAMPLE

Examples of the invention are given below by way of illustration and not by way of limitation.

Examples 1–6 and Comparative Examples 1–6

A solid core having a diameter of 38.6 mm and a hardness corresponding to a distortion of 3.7 mm under an applied load of 100 kg was prepared using a well-known rubber composition for making a solid core.

Golf ball cover stocks of Examples 1–6 and Comparative Examples 1–6 were prepared by blending components according to the formulation shown in Tables 1 and 2 and melt mixing them in a twin-screw extruder at 180° C. The crosslinked functional rubbery copolymer blended in Examples of the invention was XER91P by Nippon Synthetic Rubber K.K. The core-shell polymer blended in Comparative Examples 4–6 was Stafiloid IM203 by Takeda Pharmaceutical Industry K.K. The resulting cover stocks were injection molded over the core to complete golf balls of Examples 1–6 and Comparative Examples 1–6.

The golf balls thus obtained were examined for hardness, restitution, durability, and feel by the following tests.

Hardness

Ball hardness was expressed by a distortion (mm) of a ball under an applied load of 100 kg.

Index of restitution

A ball was measured for initial velocity using an initial velocity meter of the type prescribed by USGA. The result is expressed by a relative value based on an index of restitution of 100.0 for Comparative Examples 1, 7 and 8.

Index of durability

Using a flywheel hitting machine, a ball was repetitively struck at a head speed of 38 m/s until the ball was broken. The number of strikes at rupture is expressed as an index provided that the number of strikes for Comparative Examples 1, 7 and 8 is 100.

Hitting feel

With a driver (#1 wood) PRO230 Titanium (loft angle 11°, shaft HM50J(HK) by Bridgestone Sports Co., Ltd.), an actual hitting test was performed by a panel of five golfers with a head speed of 45 m/sec. The ball was rated according to the following criterion.

○: soft

Δ: average x: hard

The results are also shown in Tables 1 and 2.

TABLE 1

| | | Example | | | | | |
|---|---|---|---|---|---|---|---|
| | | 1 | 2 | 3 | 4 | 5 | 6 |
| Cover compo-sition (pbw) | Himilan 1605[*1] | 50 | 50 | — | — | — | — |
| | Himilan 1706[*2] | 50 | 50 | — | — | — | — |
| | Himilan AM7317[*3] | — | — | 50 | 50 | — | — |
| | Himilan AM7318[*4] | — | — | 50 | 50 | 50 | 50 |
| | Himilan AM7315[*5] | — | — | — | — | 50 | 50 |
| | XER91P[*6] | 5 | 10 | 5 | 10 | 5 | 10 |
| | TiO$_2$ | 1 | 1 | 1 | 1 | 1 | |
| Cover | Gage (mm) | 2.0 | 2.0 | 2.0 | 2.0 | 2.0 | 2.0 |
| | Hardness (Shore D) | 64 | 63 | 66 | 65 | 66 | 65 |
| Solid core | Diameter (mm) | 38.6 | 38.6 | 38.6 | 38.6 | 38.6 | 38.6 |
| | Weight (g) | 35.1 | 35.1 | 35.1 | 35.1 | 35.1 | 35.1 |
| | Hardness (mm) | 3.7 | 3.7 | 3.7 | 3.7 | 3.7 | 3.7 |
| Ball | Diameter (mm) | 42.7 | 42.7 | 42.7 | 42.7 | 42.7 | 42.7 |
| | Weight (g) | 45.2 | 45.2 | 45.2 | 45.2 | 45.2 | 45.2 |
| | Hardness (mm) | 2.8 | 2.8 | 2.7 | 2.8 | 2.7 | 2.7 |
| Index of restitution | | 99.8 | 99.8 | 100.3 | 100.0 | 100.2 | 100.0 |
| Index of durability | | 122 | 128 | 107 | 103 | 101 | 113 |
| Hitting feel | | ○ | ○ | ○ | ○ | ○ | ○ |

TABLE 2

| | | Comparative Example | | | | | |
|---|---|---|---|---|---|---|---|
| | | 1 | 2 | 3 | 4 | 5 | 6 |
| Cover compo-sition (pbw) | Himilan 1605[*1] | 50 | — | — | 50 | — | — |
| | Himilan 1706[*2] | 50 | — | — | 50 | — | — |
| | Himilan AM7317[*3] | — | 50 | — | — | 50 | — |
| | Himilan AM7318[*4] | — | 50 | 50 | — | 50 | 50 |

TABLE 2-continued

|  |  | Comparative Example | | | | | |
|---|---|---|---|---|---|---|---|
|  |  | 1 | 2 | 3 | 4 | 5 | 6 |
|  | Himilan AM7315*5 | — | — | 50 | — | — | 50 |
|  | IM203*7 | — | — | — | 10 | 10 | 10 |
|  | TiO$_2$ | 1 | 1 | 1 | 1 | 1 | 1 |
| Cover | Gage (mm) | 2.0 | 2.0 | 2.0 | 2.0 | 2.0 | 2.0 |
|  | Hardness (Shore D) | 65 | 66 | 67 | 63 | 65 | 65 |
| Solid | Diameter (mm) | 38.6 | 38.6 | 38.6 | 38.6 | 38.6 | 38.6 |
| core | Weight (g) | 35.1 | 35.1 | 35.1 | 35.1 | 35.1 | 35.1 |
|  | Hardness (mm) | 3.7 | 3.7 | 3.7 | 3.7 | 3.7 | 3.7 |
| Ball | Diameter (mm) | 42.7 | 42.7 | 42.7 | 42.7 | 42.7 | 42.7 |
|  | Weight (g) | 45.2 | 45.2 | 45.2 | 45.2 | 45.2 | 45.2 |
|  | Hardness (mm) | 2.8 | 2.7 | 2.6 | 2.9 | 2.7 | 2.7 |
| Index of restitution | | 100.0 | 100.4 | 100.5 | 99.6 | 100.1 | 100.0 |
| Index of durability | | 100 | 82 | 87 | 111 | 95 | 98 |
| Hitting feel | | ○ | ○ | Δ | ○ | ○ | ○ |

*1Himilan 1605 sodium ion neutralized ionomer resin of ethylene-methacrylic acid copolymer, Shore D hardness 64, acid content 15% by weight, by Mitsui duPont Polychemical K.K.
*2Himilan 1706 zinc ion neutralized ionomer resin of ethylene-methacrylic acid copolymer, Shore D hardness 63, acid content 15% by weight, by Mitsui duPont Polychemical K.K.
*3Himilan AM7317 zinc ion neutralized ionomer resin of ethylene-methacrylic acid copolymer, Shore D hardness 64, acid content 18% by weight, by Mitsui duPont Polychemical K.K.
*4Himilan AM7318 sodium ion neutralized ionomer resin of ethylene-methacrylic acid copolymer, Shore D hardness 65, acid content 18% by weight, by Mitsui duPont Polychemical K.K.
*5Himilan AM7315: zinc ion neutralized ionomer resin of ethylene-methacrylic acid copolymer, Shore D hardness 66, acid content 20% by weight, by Mitsui duPont Polychemical K.K.
*6XER91P: resin modifier in the form of a functional rubbery copolymer which is a crosslinked acrylonitrile-butadiene rubber having a carboxyl group introduced thereto; acrylonitrile content, 20 wt %; carboxyl group content, 10 mg KOH/g; mean particle size, 70 nm; gel content, 91 wt %; manufactured by Nippon Synthetic Rubber K.K.
*7Stafiloid IM203: resin modifier in the form of a core-shell type copolymer in which a core composed of a butyl acrylate copolymer (crosslinked arylic rubber) having an epoxy group introduced thereto is covered with a shell composed of polymethylmethacrylate; core/shell ratio, 85:15 (wt %), particle size, 550 nm, manufactured by Takeda Pharmaceutical Industry K.K.

Examples 7–8 and Comparative Examle 7

Golf balls of Examples 7–8 and Comparative Example 7 were prepared in the same manner as in Examples 1–6 except that the cover stocks shown in Table 3 were used. The golf balls were examined by the same tests as in Examples 1–6, with the results shown in Table 3.

TABLE 3

|  |  | E7 | E8 | CE7 |
|---|---|---|---|---|
| Cover | Himilan 1605*1 | 50 | 50 | 50 |
| composition | Himilan 1706*2 | 50 | 50 | 50 |
| (pbw) | XER71P*8 | 2.5 | 5 | — |
|  | TiO$_2$ | 1 | 1 | 1 |
|  | Magnesium stearate | 1 | 1 | 1 |
| Cover | Gage (mm) | 2.0 | 2.0 | 2.0 |
|  | Hardness (Shore D) | 64 | 63 | 64 |
| Solid core | Diameter (mm) | 38.5 | 38.5 | 38.5 |
|  | Weight (g) | 34.9 | 34.9 | 34.9 |
|  | Hardness (mm) | 3.4 | 3.4 | 3.4 |
| Ball | Diameter (mm) | 42.76 | 42.77 | 42.7 |
|  | Weight (g) | 45.27 | 45.31 | 45.03 |
|  | Hardness (mm) | 2.622 | 2.664 | 2.66 |
| Index of restitution | | 99.9 | 99.7 | 100.0 |

TABLE 3-continued

|  | E7 | E8 | CE7 |
|---|---|---|---|
| Index of durability | 119 | 136 | 100 |
| Hitting feel | ○ | ○ | ○ |

*1, *2see above
*8XER71P: resin modifier in the form of a functional rubbery copolymer which is a crosslinked acrylonitrile-butadiene rubber having an epoxy group introduced thereto; acrylonitrile content, 20 wt %; epoxy equivalent, 10,000; mean particle size, 70 nm; gel content, 93 wt %; manufactured by Nippon Synthetic Rubber K.K.

Examples 9–11 and Comparative Examples 8–9

Golf balls of Examples 9-11 and Comparative Examples 8–9 were prepared in the same manner as in Examples 1–6 except that the cover stocks shown in Table 4 were used. The golf balls were examined by the same tests as in Examples 1–6, with the results shown in Table 4.

TABLE 4

|  |  | E9 | E10 | E11 | CE8 | CE9 |
|---|---|---|---|---|---|---|
| Cover | Himilan 1601*9 | 50 | — | — | 50 | — |
| composition | Himilan 1557*10 | — | 50 | — | 50 | — |
| (pbw) | Himilan 1855*11 | — | — | — | — | 50 |
|  | Himilan 1605*1 | — | 50 | 50 | — | 50 |
|  | Himilan 1706*2 | 50 | — | 50 | — | — |
|  | XER91P*6 | 5 | 10 | 20 | — | — |
|  | TiO$_2$ | 4 | 4 | 4 | 4 | 4 |
|  | Magnesium stearate | 1 | 1 | 1 | 1 | 1 |
| Cover | Gage (mm) | 2.0 | 2.0 | 2.0 | 2.0 | 2.0 |
|  | Hardness (Shore D) | 59 | 59 | 60 | 57 | 58 |
| Solid core | Diameter (mm) | 38.6 | 38.6 | 38.6 | 38.6 | 38.6 |
|  | Weight (g) | 35.1 | 35.1 | 35.1 | 35.1 | 35.1 |
|  | Hardness (mm) | 3.1 | 3.1 | 3.1 | 3.1 | 3.1 |
| Ball | Diameter (mm) | 42.7 | 42.7 | 42.7 | 42.7 | 42.7 |
|  | Weight (g) | 45.3 | 45.3 | 45.4 | 45.2 | 45.3 |
|  | Hardness (mm) | 2.5 | 2.6 | 2.5 | 2.6 | 2.7 |
| Index of restitution | | 100.0 | 99.9 | 100.0 | 100.0 | 99.7 |
| Index of durability | | 118 | 163 | 166 | 100 | 111 |
| Hitting feel | | ○ | ○ | ○ | ○ | ○ |

*1, *2, *6see above
*9Himilan 1601 sodium ion neutralized ionomer resin of ethylene-methacrylic acid copolymer, Shore D hardness 56, acid content 10% by weight, by Mitsui duPont Polychemical K.K.
*10Himilan 1557 zinc ion neutralized ionomer resin of ethylene-methacrylic acid copolymer, Shore D hardness 57, acid content 12% by weight, by Mitsui duPont Polychemical K.K.
*11Himilan 1855 zinc ion neutralized ionomer resin of ethylene-methacrylic acid-acrylate terpolymer, Shore D hardness 54, acid content 10% by weight, by Mitsui duPont Polychemical K.K.

As is evident from Tables 1 to 4, Comparative Example 1 using a commonly used ionomer resin having an acid content of 15% by weight as a cover stock and Comparative Examples 2 and 3 using ionomer resins having an acid content of 18% and 20% by weight as a cover stock indicate that an ionomer resin having a higher acid content is effective for improving restitution, but impractical because of substantially reduced durability and poor hitting feel.

In Comparative Examples 4–6 and Examples 1–6, a composition consisting of 100 parts by weight of the same base or matrix resin as in Comparative Examples 1–3 and 5 or parts by weight of a crosslinked functional rubbery copolymer or core-shell copolymer is used as a cover stock for the purpose of improving durability. When 10 parts by weight of a crosslinked functional rubbery copolymer or core-shell copolymer is blended, the balls are approximately equal in restitution, hardness and hitting feel. With respect to durability, however, the ball using a crosslinked functional rubbery copolymer shows an improvement of about 10% over the ball using a core-shell polymer (compare Comparative Example 4 with Example 2, Comparative Example 5 with Example 4, and Comparative Example 6 with Example 6). The blending of 5 parts by weight of a crosslinked functional rubbery copolymer gives superior durability to the blending of 10 parts by weight of a core-shell copolymer (see Examples 1, 3, and 5). It was thus acknowledged that a crosslinked functional rubbery copolymer, even when blended in a small amount, provides improved durability and a soft hitting feel while maintaining restitution. The same effect was acknowledged from Table 3 when a crosslinked epoxy-functional rubbery copolymer (XER71P) was added in a small amount.

There has been described a cover stock composed mainly of a rubber-modified thermoplastic resin composition which is obtained by blending a base resin in the form of an ionomer resin, a non-ionomer thermoplastic elastomer or a mixture thereof with a crosslinked functional rubbery copolymer. Golf balls having a cover formed of this cover stock are improved in durability without detracting from restitution and offer a soft hitting feel equivalent to wound golf balls.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A golf ball comprising a core and a cover enclosing the core, said cover having one or more layers,
   at least one cover layer being composed mainly of a rubber-modified thermoplastic resin composition consisting essentially of a base resin in the form of an ionomer resin, a non-ionomer thermoplastic elastomer or a mixture thereof and a crosslinked functional rubbery copolymer,
   wherein said crosslinked functional rubbery copolymer has a gel content of at least 20% by weight; and
   wherein said crosslinked functional rubbery copolymer is a crosslinked copolymer of
   (a) a monomer having at least one functional group selected from the group consisting of carboxyl, epoxy, hydroxyl and amino groups,
   (b) at least one monomer selected from the group consisting of acrylonitrile, butadiene, isoprene, and acrylates, and
   (c) a crosslinker in the form of a polyfunctional monomer selected from the group of divinyl ether, divinyl benzene and ethylene glycol di(meth)acrylate.

2. The golf ball of claim 1 wherein said functional rubbery copolymer is a particulate one having a mean particle size of up to 500 nm.

3. The golf ball of claim 1 wherein the ionomer resin is constructed of an olefin-unsaturated carboxylic acid copolymer having an acid content of 10 to 25% by weight.

4. The golf ball of claim 1 wherein the non-ionomer thermoplastic elastomer is selected from the group consisting of a polyurethane elastomer, polyester elastomer, polyamide elastomer, and a mixture thereof.

* * * * *